United States Patent
Esposito et al.

(10) Patent No.: US 6,363,453 B1
(45) Date of Patent: Mar. 26, 2002

(54) PARALLEL PROCESSOR WITH REDUNDANCY OF PROCESSOR PAIRS

(75) Inventors: Antonio Esposito, Caserta; Rosario Esposito, Naples, both of (IT)

(73) Assignee: biProcessor S.r.L., Caserta (IT)

( * ) Notice: Subject to any disclaimer, the term of this patent is extended or adjusted under 35 U.S.C. 154(b) by 0 days.

(21) Appl. No.: 09/194,459
(22) PCT Filed: May 28, 1997
(86) PCT No.: PCT/IT97/00121
§ 371 Date: Nov. 24, 1998
§ 102(e) Date: Nov. 24, 1998
(87) PCT Pub. No.: WO97/45795
PCT Pub. Date: Dec. 4, 1997

(30) Foreign Application Priority Data

May 30, 1996 (IT) ......................................... NA96A0032

(51) Int. Cl.⁷ ............................................... G06F 13/38
(52) U.S. Cl. ............................................. 711/2; 712/31
(58) Field of Search .................... 345/504, 503; 712/31, 34; 711/2

(56) References Cited

U.S. PATENT DOCUMENTS 4,358,823 A  11/1982  McDonald ................... 364/200
4,866,597 A  * 9/1989  Kinoshita .................... 709/214

FOREIGN PATENT DOCUMENTS

EP  0 298 396  1/1989  .............. B25J/9/18
GB  2 251 964  7/1992  ........... G06F/13/40

* cited by examiner

Primary Examiner—Eric Coleman
(74) Attorney, Agent, or Firm—Dougherty & Clements LLP

(57) ABSTRACT

General purpose parallel computer, latency reduction MIMD, with multiple processors, and multiple memory address spaces, wherein processors (SPU) are redundantly replicated on each memory (M) bus (C-BUS) and, formed/connected as either master-active or slave-active of the bus and to interface a suitable communication structure (A-S) for transferring among themselves the process context and the bus control, in such a way to execute in turn a unique migrant sequential process per bus (C-BUS), and wherein each processor is also directly and tightly coupled with devoted private buses (P-P) to one corresponding processor of another one bus (C-BUS) in a way to form, between distinct buses (C-BUS), biprocessor pairs (DPU) capable of allowing communication and synchronization of the parallel migrant processes.

38 Claims, 8 Drawing Sheets

PARALLEL PROCESSOR WITH REDUNDANCY OF PROCESSOR PAIRS

TECHNICAL FIELD

This invention relates to a general purpose electronic numeric parallel computer with multiple processors. MIMD (Multiple Instruction stream Multiple Data stream) in the Flynn's classification model, latency reduction oriented, and relates also to its composing processors.

Replication or regularly interconnected and co-operating processing elements or nodes can improve performances, reliability and costs of computers.

MIMD with multiple processors, also called MULTI, consists of a collection of processors that, through an interconnection structure, either share a global memory or only communicate without memory sharing. The formers are also called multiprocessors, the latter multicomputers.

BACKGROUND ART

Beyond advantages, current MULTI still have inconveniences and disadvantages.

To communicate among parallel processes, multiprocessors adopt the same processor-memory communication mechanism, which results flexible and suitable for whatever computation, but the shared memory becomes a "bottleneck" as the number of approaching processors increases.

The complexity and the costs of multi-ported memory can be bounded only at the expense of increased memory latency, or reducing memory traffic by using local cache memories, which add further complexity and costs to manage their coherency protocols.

Within multicomputers each processor has a private memory that allows less latency and more scalability, but existing communication mechanisms do nor allow efficient communication among parallel processes. The communication of a message requires an input/output operation. Even associating a message to a high priority interrupt, its average latency remains greater than the one of the access to the shared memory.

The used interconnection structures determine the topology, the node or connection degree, and several performance characteristics of MULTI. Any direct connection among nodes also requires a node interface. Since the node decree increases with the growing of the number nodes, the interconnection costs rapidly prevail on the machine costs. According to current technologies, the node degree must be held necessarily low, even if this increases the probability of congestion and conflicts, makes the communication latency inconstant, and performances result dependent on the space-time distribution of the traffic and on the application itself. In order to have flexible and accessible networks at acceptable costs, optimal topologies are used as well as switching and message combining elements, buffers, routing and flow control techniques, all of which make the current interconnection structures hard to manufacture, and still too expensive and inefficient by the performance point of view.

The degree of parallelism matches the number of processors, but the total computing power also depends upon the power of the single processors. Actual realisations have constraints by which these two power factors are not independent. The parallel processes communicate on globally shared resources with limited capacity and this generates congestions and/or access conflicts which degrade the expected performances either with the growing of the processor number and with the growing of the single processor power.

Within MULTI the difficulty to synchronise the parallel processes strongly reduces the number of applications that can take advantage of a parallel execution. Problems do not reside in distributing a common iso-frequential timing signal to all processors, as it is ordinarily done within SIMD too, but mainly in the impossibility to predict the exact execution time of a process. Each processor has its own autonomous sequence control, and as time passes, parallel processes become timely unrelated one another, in a way that they are not controllable by the programmer.

Synchronisation is achieved indirectly through communication. Current methods are based on message passing in the multicomputers and on access control to memory shared variables within multiprocessors. These operations, performed mostly at software level with many instructions of the ordinary repertoire and few specialised instructions (test & set, fetch & add, etc.), still result too slow, penalising, the communication time. Moreover they generate messages that increase the traffic congestion. Therefore most of MULTI built so far are unsuitable for synchronising a large number of small processes, and for strongly reducing the execution time (latency) of a single task.

Within MULTI it also exists the load balancing problem that aims to optimise use of resources by uniformly distributing the load among processors. Migration, or movement of allocation to resources after the initial decision, has been taken into account as a solution to the dynamic load balancing problem, though it has been noticed its validity also for reducing the network load, making the communication partners closer. With multicomputers the process migration is more burdened because it also requires to copy memory, therefore the migration of simpler entities is used. Convenience of run-time migration is doubtful because the transferring overload is hardly balanced by performance increments, therefore process migration from processor to processor is seldom used in highly parallel computers.

MULTI usually employ normal microprocessors available on the market and also used in SISD machine. Otherwise, they employ dedicated processors with special mechanisms for fast interrupt handling, fast context switching, with several register banks or windows, or they integrate communication/routing message interfaces and units. However the used processors are equipped with full and autonomous fetch/execution capability, and configured as memory bus masters, that once activated continuously fetch and execute instructions, but normally do not allow accessing to their own internal registers from outside, except for debug purposes. Computing nodes in multicomputers are usually multiprocessors with an application processor and one or more communication and switching routine processors, to overlap communication time with processing time, even if that increases the parallelism cost.

Aim of the invention is to find an optimal combination of processor replication and inter-connection, as well as modalities of process execution and co-operation, and to devise the appropriate structural and functional processor modifications, in a way to achieve a parallel processor or MULTI, without said inconveniences, having an optimised and very performing interconnection structure to allow an efficient communication and synchronisation among parallel processes, to reduce easily single task execution and completion time (latency). The posed technical problem is big and hard one because of the high number of possible choices at both the physical and the logical level, concerning several aspects of parallelism, investigated for long time but difficult to understand and to resolve.

DISCLOSURE OF THE INVENTION

The proposed solution, as per claim 1, consists in the direct pairing between processors of separate memory buses, in way that two tightly coupled processors can reciprocally synchronise themselves and share the internal register files, for allowing an easy communication and synchronisation between the two adjacent parallel processes of the pair, and in adopting the process migration among redundantly replicated processors on the same memory bus, to allow each process to communicate/synchronise itself with several adjacent parallel processes.

The pairing is accomplished through mutual extension of internal buses from one processor to the functional units of the other one. So the single processor also becomes a pair communication unit, normally connected to memory and peripherals, but mainly connected to another processor. More processors are connected on the same memory bus, for accessing equally rather than concurrently to the same instructions and data in the shared memory. Each memory bus is managed as a single master bus, wherein processors co-operate to the execution of a single sequential migrating process. Beyond the memory bus, processors also share a process migration structure that allows to transfer process control and "context" contained within state registers, from one processor to another one of the bus. Thus the run-time process migration among processors is achieved easily preserving identity and continuity of each process.

Processors are modified to eliminate concurrent access conflicts to the shared memory. They are formed to be, on the memory bus, either master-active like a traditional processor, either slave-inactive like a peripheral which does not perform processing activity, but that allows accessing and loading of its internal registers by the outside. A slave processor remains inactive for an indefinite period of time, awaiting to receive control and to resume processing activity starting upon received context. Processors of the same bus are individually paired with a processor belonging to a separate memory bus so as to form pairs between distinct memory buses.

The outcome processor architecture offers new instructions in two categories:

migration or intra-bus communication instructions, for handling the (sequential) interaction among processors on the same memory bus and allowing the run-time process migration;

pair communication or inter-bus communication instructions, for handling the (parallel) interaction within the pair, and allowing communication and synchronisation among parallel processes.

The parallelism comes out of the plurality of processes which simultaneously run on as many memory buses, and migrate on their own bus among paired processors to communicate/interact and synchronise themselves.

A multicomputer/multiprocessor formed in accordance with the invention has many advantages.

Congestions and access conflicts to global shared resources, which become "bottlenecks" as parallelism increases, are substantially eliminated.

Parallel processes communicate through high performance local dedicated buses, which do not require interface controllers and input/output operations. The communication among processors is based on local registers sharing, normally and efficiently achieved by hardware, and easily controlled by special pair communication and process migration instructions.

The dual access to the processor registers by both of the units of a pair allows a variable time interaction among parallel adjacent processes, and also to program the synchronisation points. Processors have direct access to the sequence control of the adjacent processors, and this allows the programmer to control mutual proceedings and time relations among all adjacent processes in parallel. Communication time between adjacent processes is mainly influenced by the process migration operation that requires a definite constant time. Therefore, also owing to the lack of conflicts/congestions, communication latency among adjacent processes is constant and can be on average lower than that in a multiprocessor. Additional devices to mask communication latency or to overlap communication and computation times, are no longer needed. Synchronisation is possible without global traffic generation and even without explicit communication. It is possible to program synchronising barriers and to achieve, within the short execution time of some new specialised instructions, the explicit synchronisation of many small processes with dimensions of few instructions, preserving also the asynchronous and efficient process execution and the other implicit synchronisation modalities. Thanks to these capabilities they can efficiently execute parallel and even synchronous algorithms. The interconnection structure, composed by inexpensive, low latency, wide bandwidth buses of ordinary make, results optimised in complexity, costs and performances. It does not force topology and machine connection degree, on the contrary it allows to obtain different topologies with a high connection degree, without the need of switching or buffering components. Within regular machines, the connection degree is given by the number of processors per bus, that is only limited by physical parameters which constrain the bus and processor dimensions, but bus bandwidth no more constitutes the main obstacle to the numeric growth of processors attachable to it.

The degree of parallelism matches the number of memory buses, and it can be freely increased, with a proportional increase of the total power, independently of the single processor power. The reducible dimensions of the pairing connections and the opportunities offered by the microelectronic (VLSI) technology allow to design and build a single logical biprocessor unit, whose integration leads to further advantages in terms of modularity, resource sharing and different part numbers.

In summary, the invention maintains about all of the advantages, but fixes most of the disadvantages, of current MULTI in both categories, with low, medium and high degree of parallelism.

The achieved process migration constitutes a "context/process switching" wherein more processors share the single process that controls the switching. There is no formatted data packet, and no maximum time interval exists within which a processor will surely lose or receive control.

No computer has ever adopted a processor relay executing for a single sequential process. The expensive functional inefficiency given by the redundancy of inactive processors is only justifiable by the rake-off gained with parallelism. On each memory bus the situation is only structurally similar to that of shared bus multiprocessors, but functionally very different. Besides the pair connections, in the invention the processors are neither standard nor all simultaneously active-masters, and they do not compete for resources and do not engage conflicts in a casual and asynchronous way. Migrations take place tidily under software control.

BRIEF DESCRIPTION OF THE DRAWINGS

Further characteristics of the invention will result by the following description, accompanied with the attached drawings, relative to no restrictive examples of topologies and realisations, depicted in the following list of figures, wherein any drawn connection line represents one or more buses, and the shown direction is the prevailing one, but it does not exclude bidirectionality or the existence of connections with opposite direction.

Figure 1:
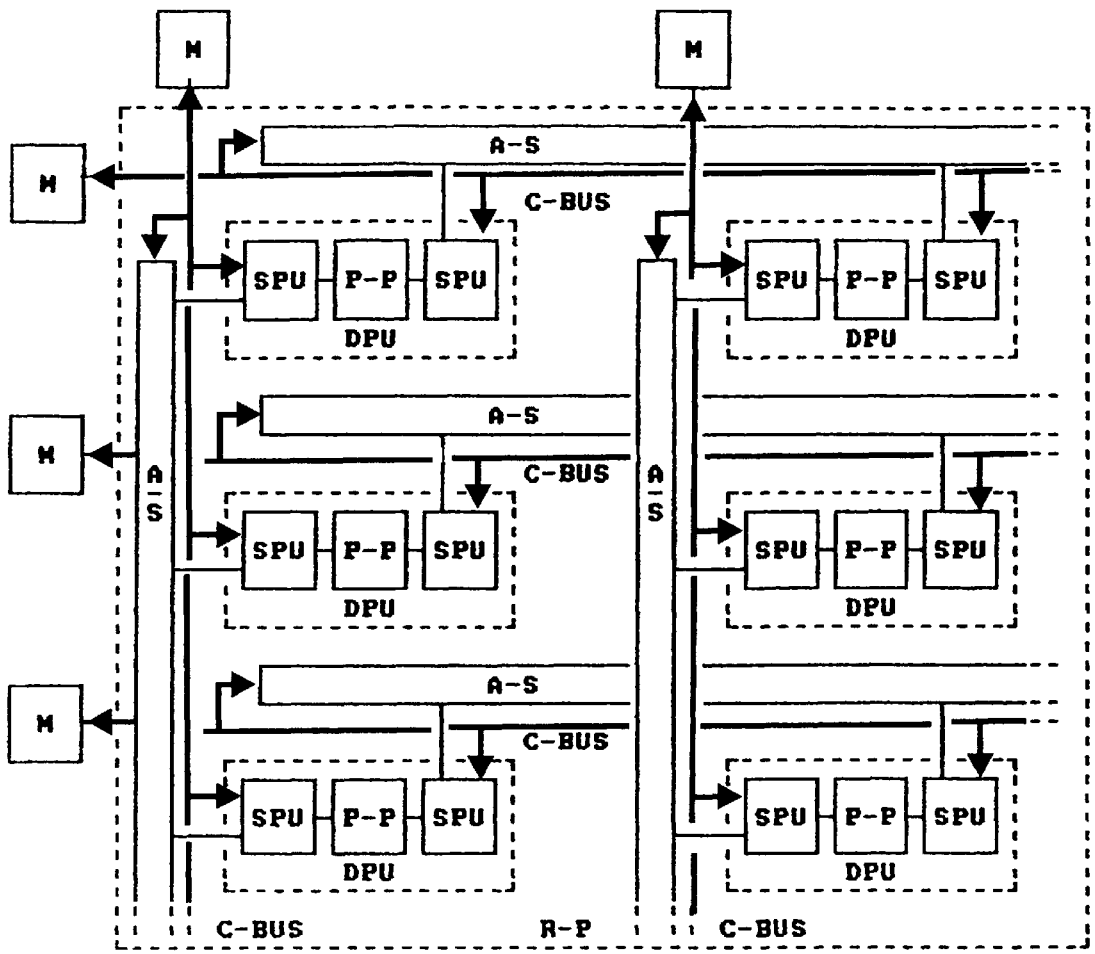
FIG. 1 shows a partial block scheme of a computer made according to the invention, in a regular "matrix" topology, reporting memory modules M, memory buses C-BUS, processors SPU, pair interconnection structures P-P, migration structures A-S, and biprocessors DPU.
Figure 2:
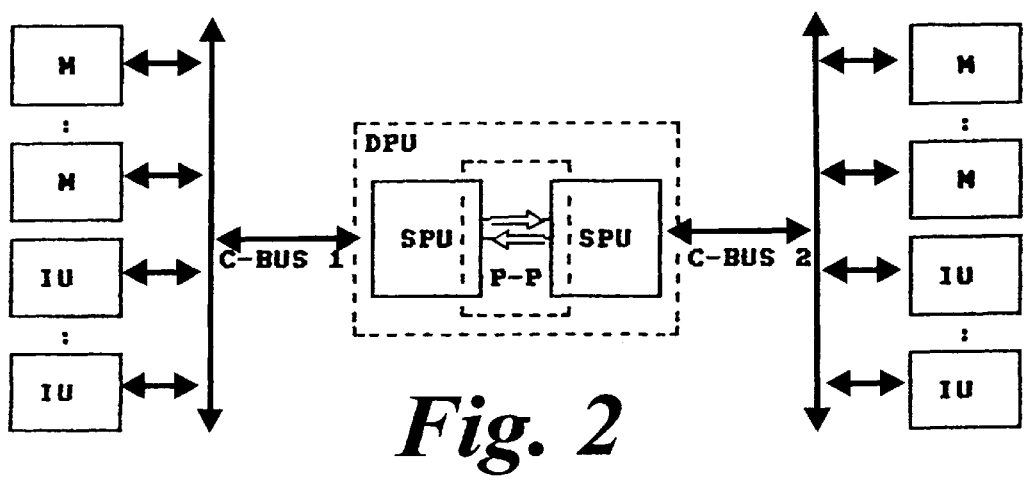
FIG. 2 shows the smallest possible configuration of multicomputer according to the invention, capable to execute in parallel only two processes that cannot migrate.
Figure 3:
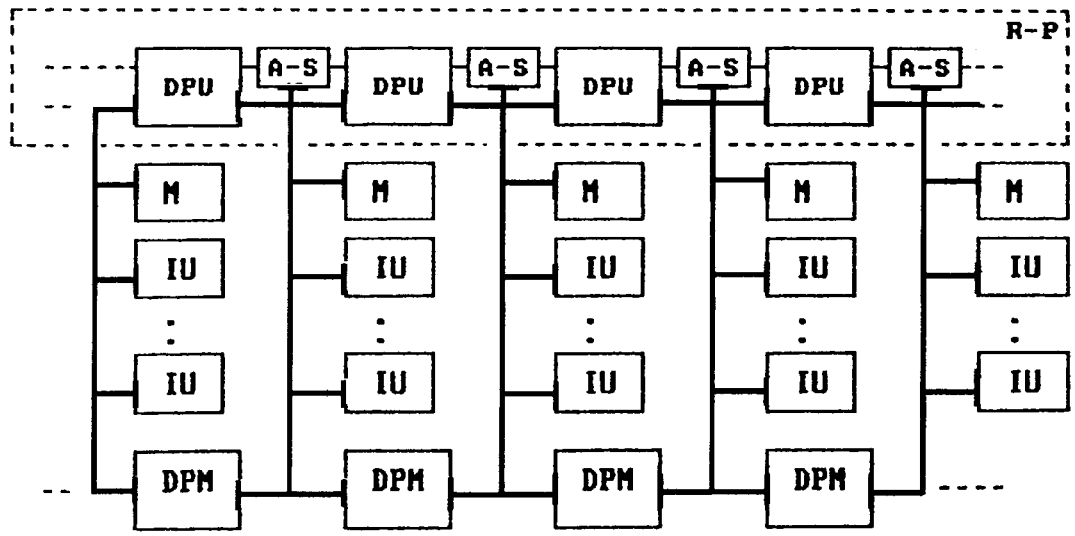
FIG. 3 shows a regular "linear chain" topology, connectable at the ends as a ring, in which are also reported dual port memories or communication memories (2-fifo) DPM, connectable like biprocessors between bus C-BUS pairs.
Figure 4:
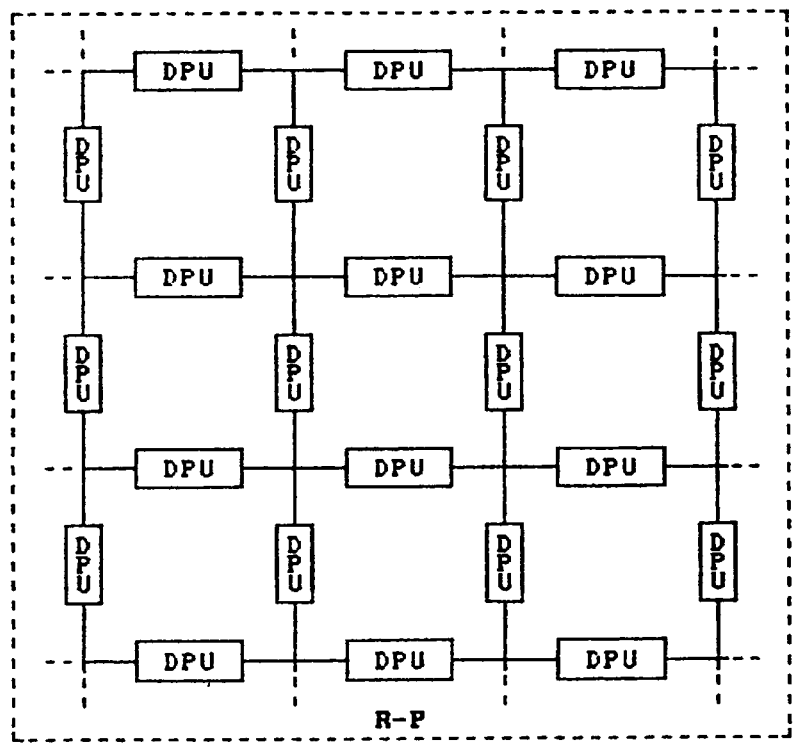
FIGS. 4, 5, 6 show other processing nets R-P with regular topology, of multicomputers fulfilled according to the invention, wherein it has been left out the distinction of the structures A-S and P-P and the representation of the others processing units (M,IU,DPM), which are supposed to be connected, on each bus C-BUS, according to the already described criterion and depicted by FIGS. 1, 2 and 3.
Figure 5:
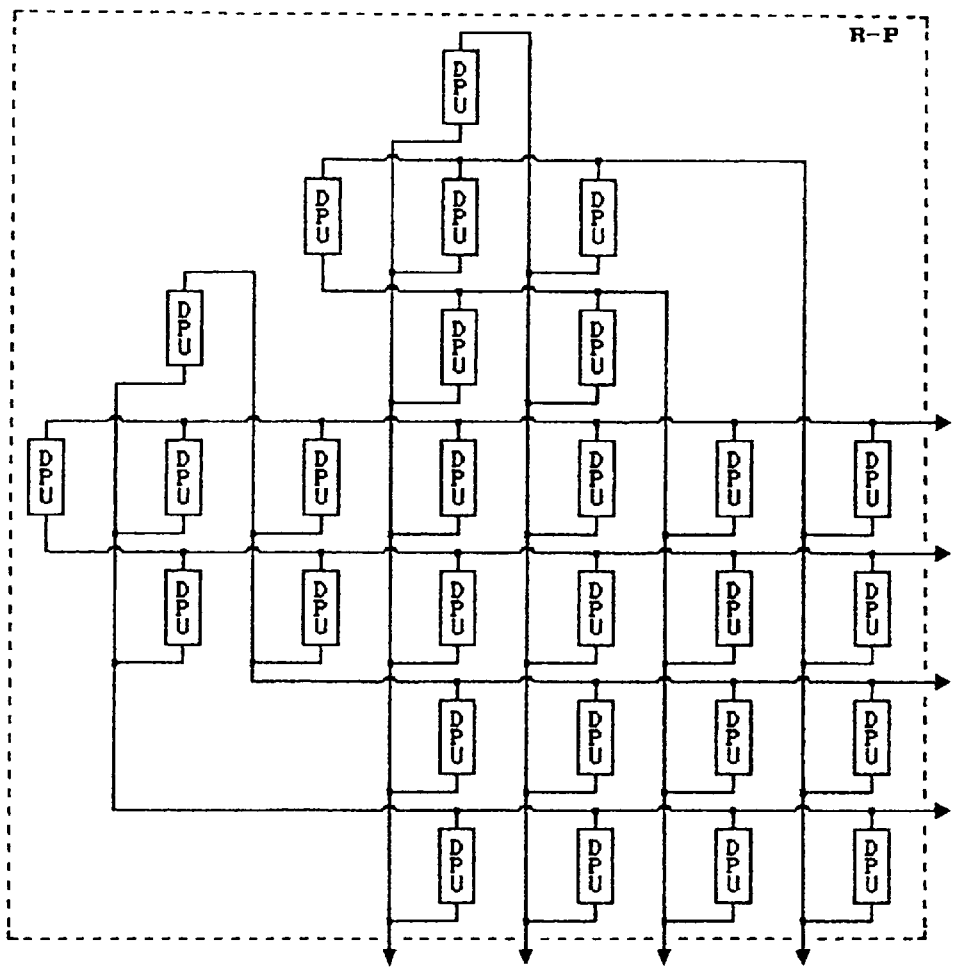
Figure 6:
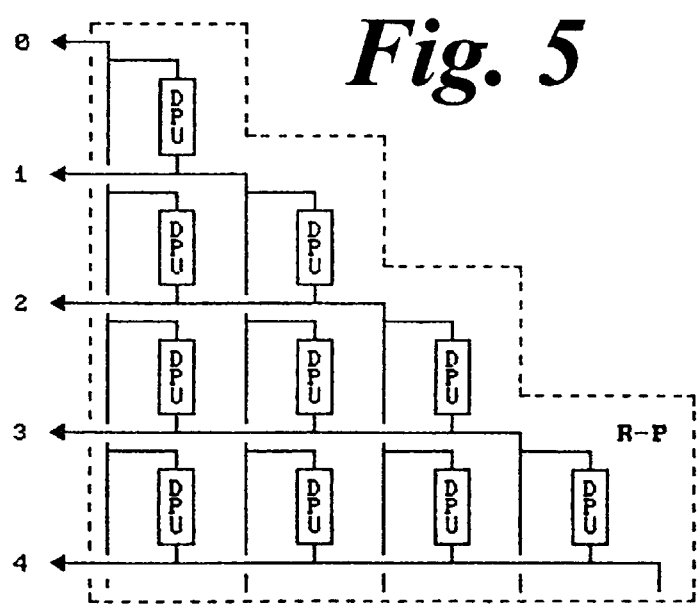
Figure 7:
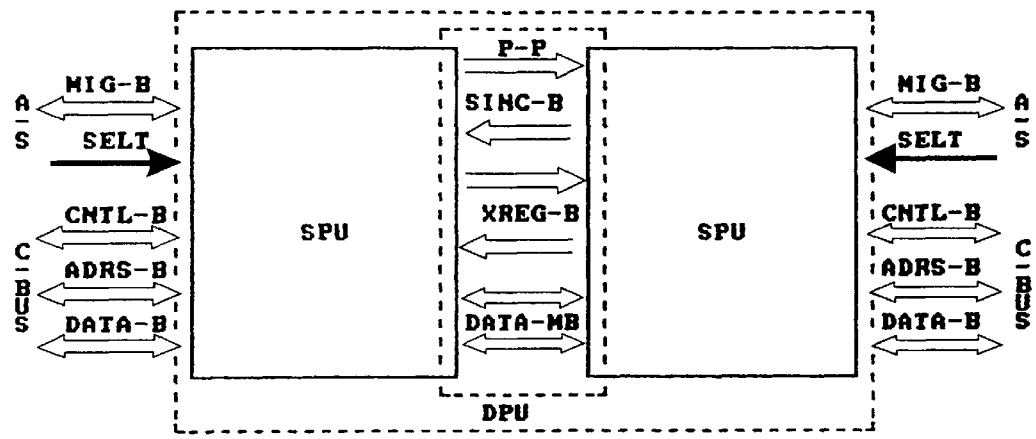
FIG. 7 shows the main external connections, shared A-S, C-BUS, and private P-P, of a processor SPU pair forming a biprocessor DPU.
Figure 8:
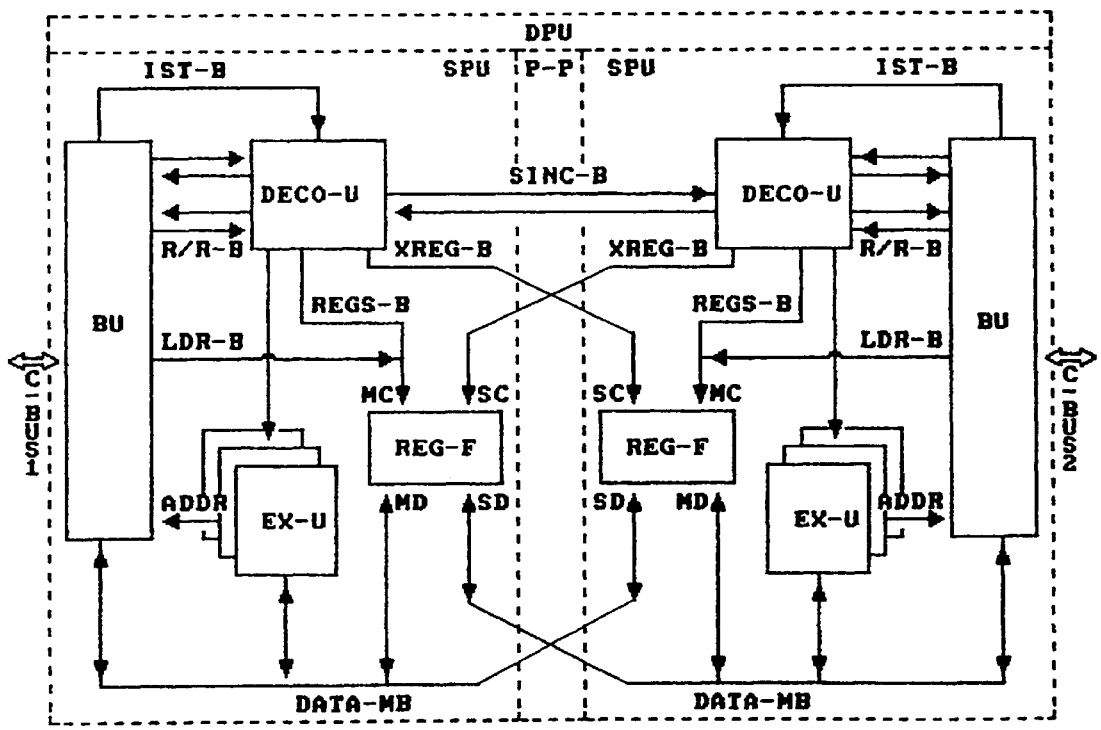
FIG. 8 shows the simplified block diagram of the main functional units of both the two processors SPU of a pair, fulfilled and connected in accordance with the invention.
Figure 9:
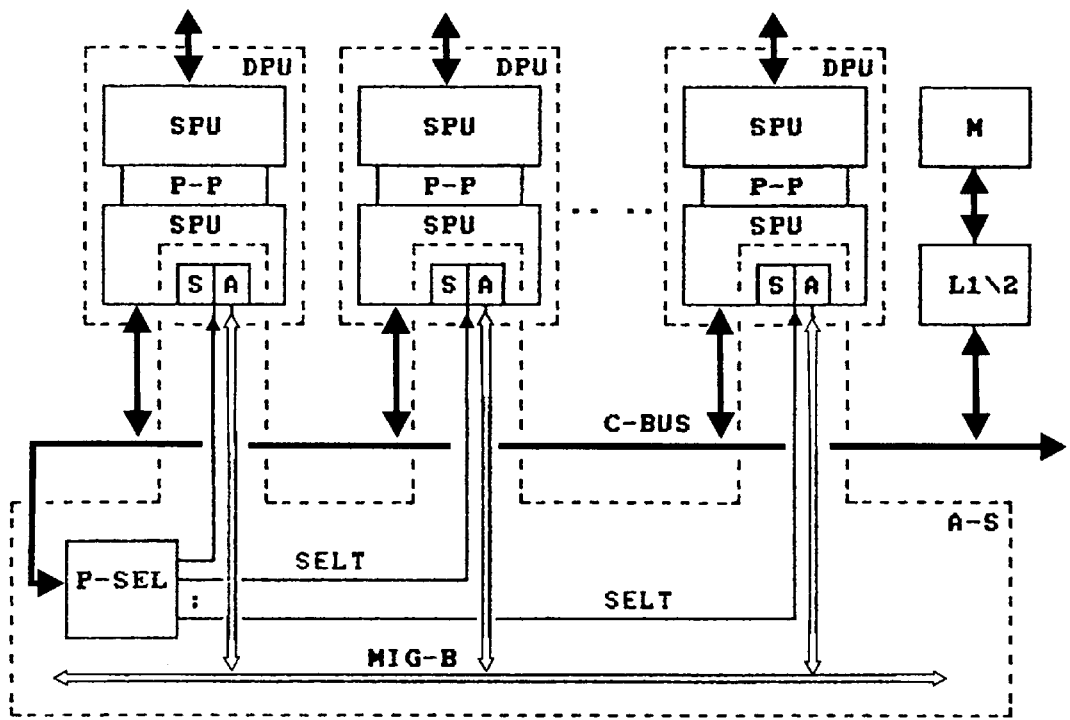
FIG. 9 shows a block scheme of the migration structure A-S of a single bus C-BUS, comprising processor selection means P-SEL, a migration bus MIG-B, and interconnection structure interfaces S and A distributed in the pair processors SPU.
Figure 10:
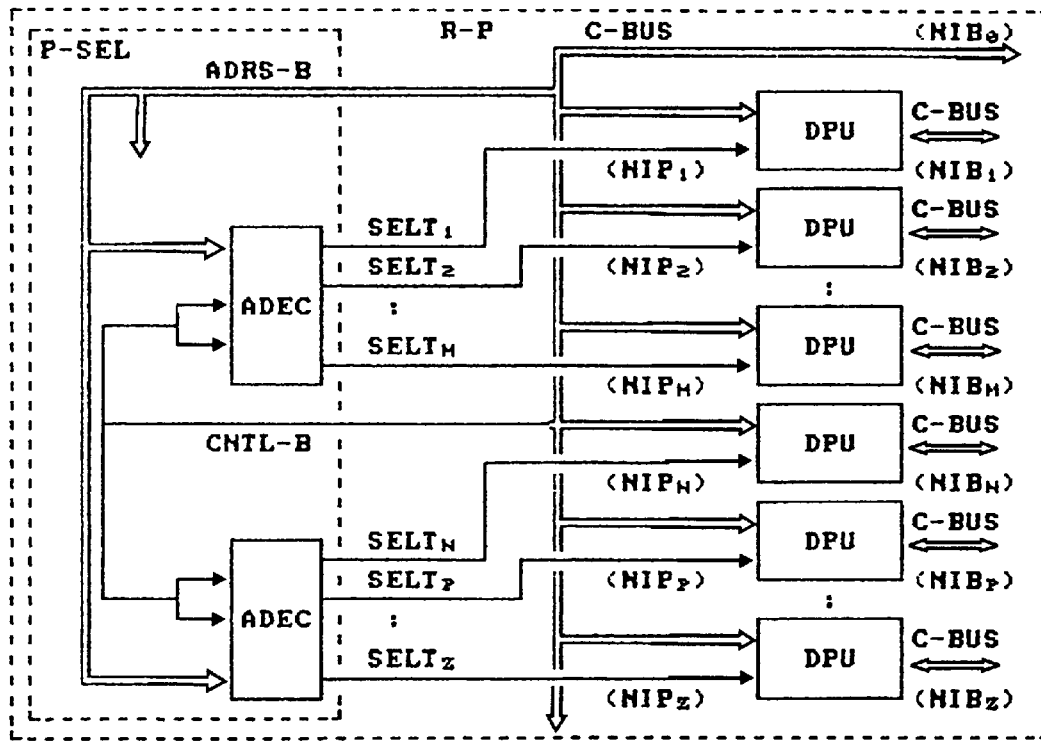
FIG. 10 shows the existence of address decoders ADEC within the selection means P-SEL of the biprocessors DPU on one same bus C-BUS.
Figure 11:
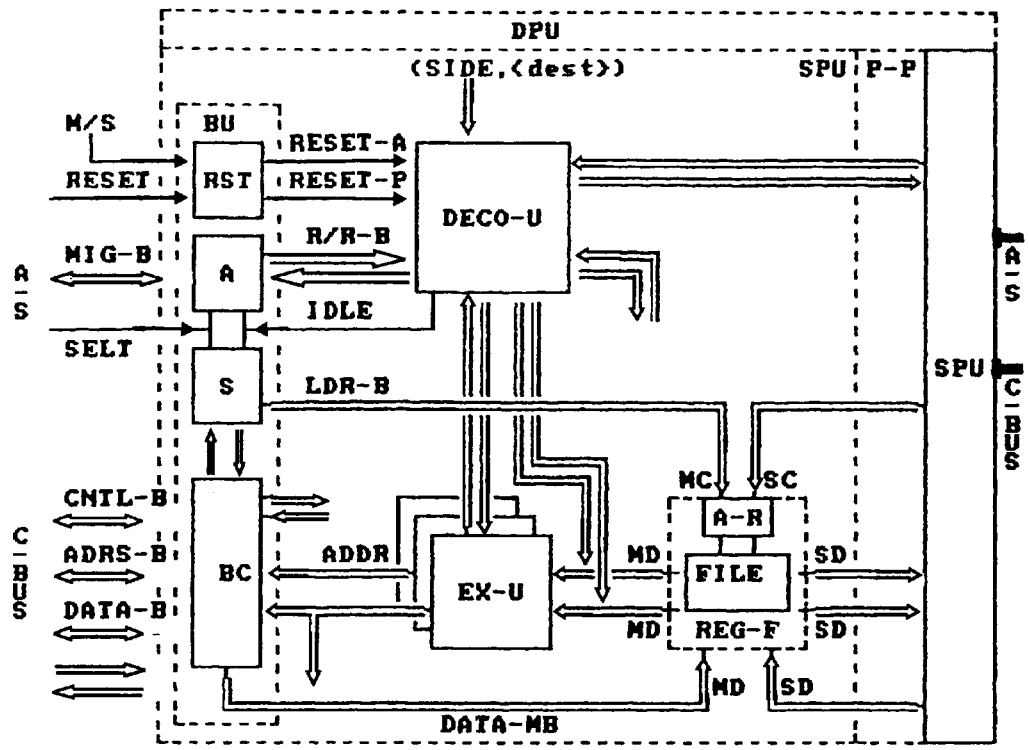
FIG. 11 shows with greater detail the internal connections of the interfaces A and S of the migration structure A-S, and presence of arbitrating means A-R between the access control ports MC, SC to processor register file REG-F.
Figure 12:
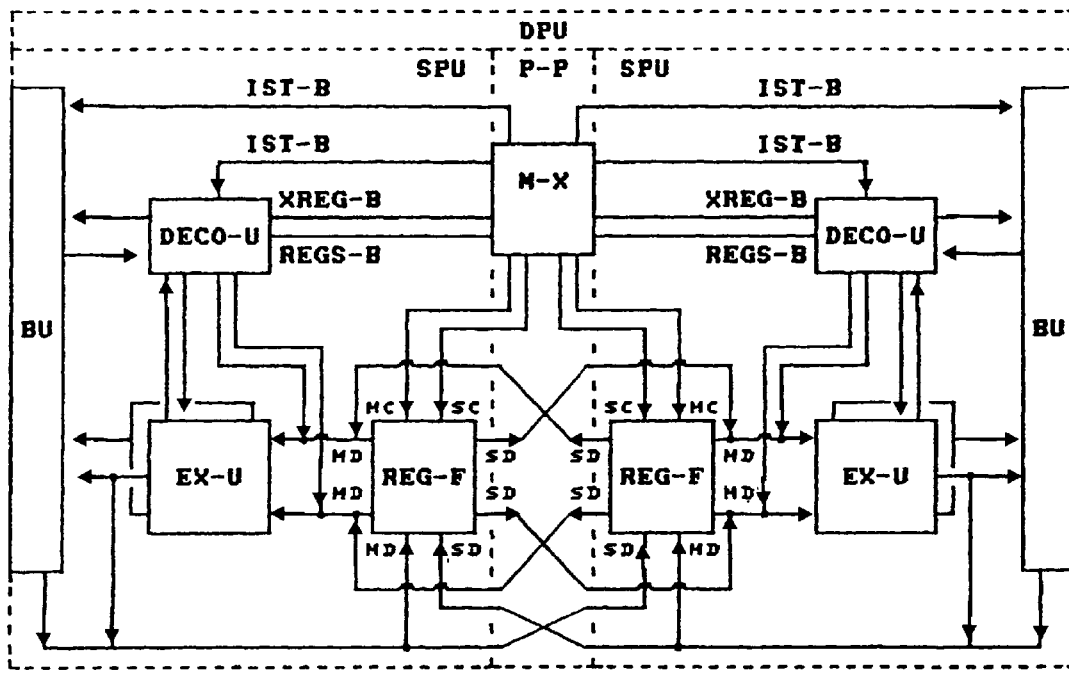
FIG. 12 shows a possible circuit switching means M-X interposed on some internal pair buses, in accordance with the invention.
Figure 13:
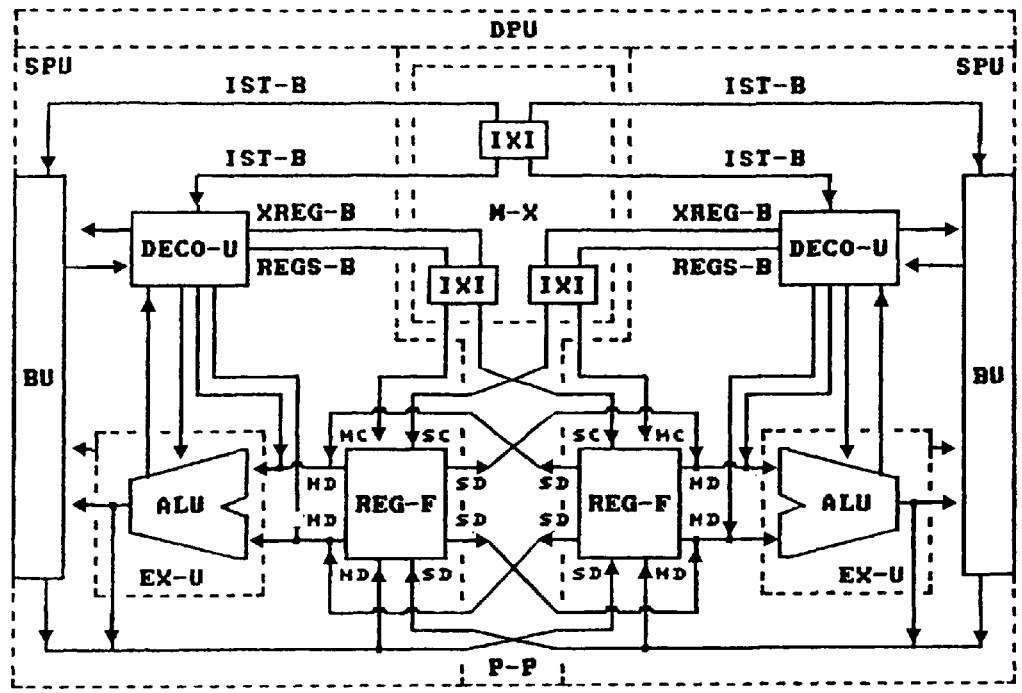
FIG. 13 shows said switching means M-X, composed of circuit switching elements IXI of 2×2 type, arranged according to the invention, and details of data connections between registers REG-F and execution units EX-U comprising arithmetic and logic unit ALU.
Figure 14:
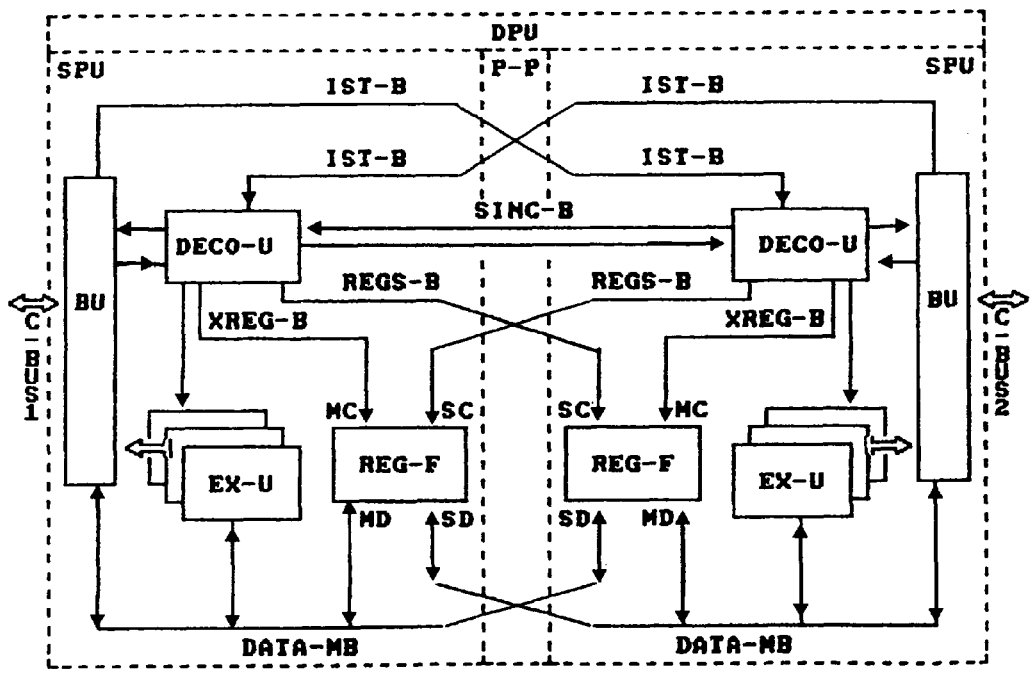
FIG. 14 shows the connection asset among the functional units of the two SPU processors in pair, when said switching means M-X are "cross switched".
Figure 15:
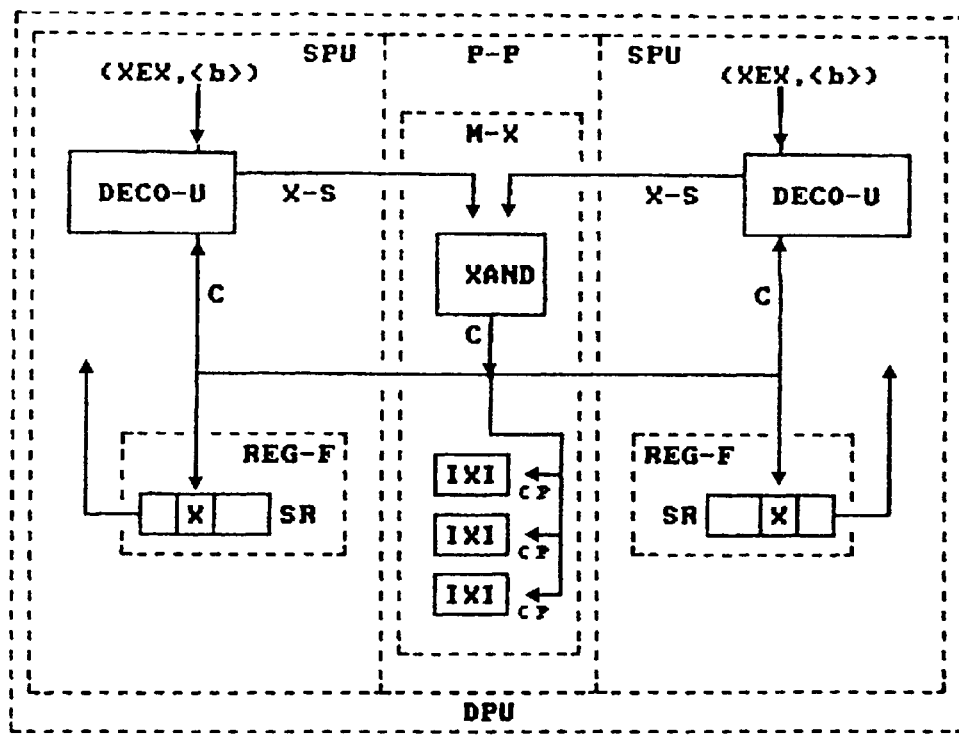
FIG. 15 shows a scheme of the command and synchronisation circuit XAND of the switching blocks IXI composing said switching means M-X.
Figure 16:
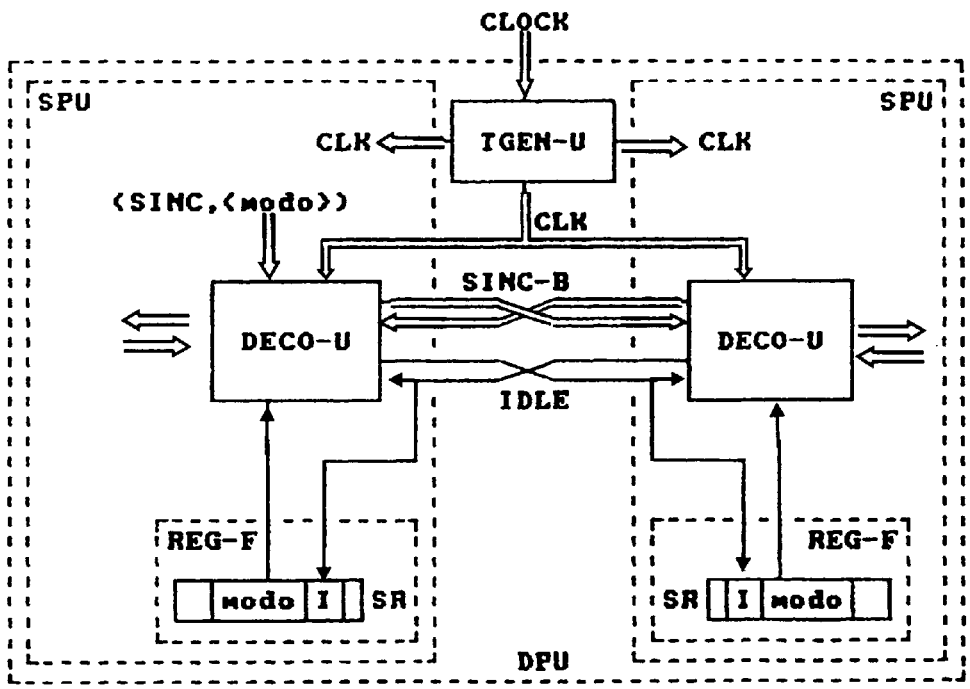
FIG. 16 shows the biprocessor DPU containing only one timing circuitry TGEN-U for both processors SPU of the pair.

The main memory M is distributed among the buses C-BUS, each one with its separate address space, giving rise to multiple private address spaces. On the single bus C-BUS, the memory M, optionally modular and hierarchical (caching) L1/2, is shared by the attached processors SPU and locally accessible in a single shared address space.

The whole interconnection structure is partitioned into several different structures: local shared structures, A-S and C-BUS, allowing process migration; private structure P-P allowing communication and synchronisation of parallel processes. Each processor SPU is connected only to one memory bus C-BUS, to one migration structure A-S, and to one pair interconnection P-P.

Input/output controllers IU can be connected to each bus C-BUS and/or directly to each memory module M, in the usual ways.

In each memory bus C-BUS only one migrant process takes place at once, and only one processor SPU per bus C-BUS is active-master at any instant, while all others are inactive-slave, awaiting to take part in the processing activity. This one-master-many-slaves situation is initially forced by reset. To recognise the different initial condition, the processor SPU reset receiving unit RST has one more input signal M/S strapped to a different logic value for the master unit compared to slave ones. An active-master processor SPU behaves on its bus C-BUS like a traditional central unit (CPU), processing, with complete control of connected resources, instructions and data contained in the local memory M of the bus C-BUS. All the modalities already contemplated in a CPU, among which in particular the hold disconnected state reached by the active unit following and during a Direct Memory Access (DMA), belong to the active-master operating mode. Within an inactive-slave processor SPU the instruction fetch-execution activity is suspended but ready to restart. Its registers are accessible from the external bus C-BUS. An inactive-slave processor can receive from the active-master one the context data, and, upon request, resume processing activity starting on received context. The inactive-slave operating mode includes all those modalities already contemplated in a peripheral or in a coprocessor when they do not access the memory. No processor SPU autonomously exits the inactive-slave state unless it is explicitly required to do so by the master processor through the migration structure A-S or by reset. The program running on a bus decides to which processor of the same bus to transfer its process by executing process migration instructions that control the block transferring of the state registers content from the active processor into the corresponding registers of the destination inactive-slave one, and also synchronise control transferring between the sender and the receiver. Migration wakes up the receiving processor as master and sends to sleep the sender as inactive-slave.

Under program control, the processors sharing the same memory bus transfer among themselves the context and control of the running process, and in turn become active-master of the bus C-BUS, in such a way to continue the migrant process without jumps or losses of instructions.

Two processors SPU of a pair DPU are almost independent form each other, and when the one is inactive-slave, the other one can continue processing. Two parallel processes are "adjacent" if they can directly interact within a pair through a pair interconnection P-P. To interact, any two adjacent processes must migrate on their bus C-BUS to the processor SPU which puts them in communication. When both reside in the same pair DPU, they can communicate and synchronise themselves by using said pair communication instructions.

The network of all processors SPU interconnected by memory buses C-BUS, by migration A-S and pair interconnection P-P structures, forms a single processing organ R-P, or parallel processor, able to process simultaneously an independent instruction and data stream on each memory bus C-BUS, and capable to synchronise the parallel processes by executing dedicated instructions opportunely programmed within the processes themselves.

BEST MODE FOR CARRYING OUT THE INVENTION

The invention can be carried out in several processor realisation modes, general purpose CISC or modern RISC for executing sequential programs. To illustrate the characteristics of the invented pair processor SPU, in the following we will consider a simple but not restrictive processor representation scheme, comprising usual functional units, normally interconnected and operating among which at least:

- a bus unit BU, for interfacing the processor to the memory bus C-BUS and to the other external structures, and for assuring physical compatibility and signal driving on the bus, receiving from the internal executive units EX-U, under the control unit DECO-U control, data and addresses of the memory locations to access, and able to control the external bus cycles and data transferring to/from the outside and the internal registers, and able to transfer to the decode and control unit DECO-U the criterions concerning interrupts, exception conditions, arbitration etc., and the instructions coming from the memory;
- a set of executive units EX-U, all connected and controlled by the decode and control unit DECO-U, and connected to said bus unit BU by data buses DATA-MB and someone also by address buses ADDR, for executing as usual, at least the arithmetic and logic operations, the memory data loading and storing operations, the address generation and branch operations or also the floating point ones, etc., and sending the computed addresses and data to the resisters REG-F or to the bus unit BU, and the conditions/exceptions to the control unit DECO-U;
- a bank of general and special purpose registers REG-F, for containing the processor state or context, with a set of data ports MD normally connected by data multi bus DATA-MB to said executive units EX-U and to the bus unit BU, and controlled by at least one control port MC connected with a control bus REGS-B to the control unit DECO-U;
- a decode and control unit DECO-U, asking/receiving, via an input instruction bus IST-B a single sequential instruction stream, and decoding and controlling the instruction executions and sending the immediate data to the executive units B-U, and controlling the data flow to/from the registers bank REG-F and also coordinating the other functional units.

The processor SPU can also comprise registers which do not belong to the state, optional buffers, data and instructions caches, and optional prefetch and branch prediction units, memory management units (MMU,TLB), interconnected and operating in the usual ways. The registers bank REG-F usually has two output and one input data ports, but it can also have a greater or lower number of data ports. The bank Program Counter register can be directly connected even to the prefetch unit. The bus unit BU comprises at least the bus transferring control unit BC and the external bus C-BUS drivers. Usually it also includes other units as bus C-BUS arbitrating units, interrupts reception/control unit, external/internal cache control units, etc.

According to the invention, the bus unit BU is designed to be either master or slave of the memory bus C-BUS. It includes means for interfacing the migration structure A-S to the processor internal registers REG-F and control unit. It is connected internally by a selection/control bus LDR-B to the near resister bank REG-F for context registers REG-F loading from the outside, and it is connected to the control unit DECO-U by a further control transferring bus R/R-B for signalling the release/resume of processing activity. The bus unit BU sets itself to master or slave according to the active or inactive state of its control unit DECO-U. In slave mode, beyond the external access/loading of internal registers REG-F, upon receiving of a control migration criterion from the migration structure A-S, it allows to wake up the decode and control unit through the control transferring bus R/R-B.

The control unit DECO-U suspends any host processor activity and sets the connected bus unit BU in slave mode, upon receiving the special slave reset signal RESET-P by the receiving reset unit RST. In the inactive-slave state the decode unit DECO-U does not process instructions, but allows access to the register by the outside bus C-BUS and by the pair unit. The inactive control unit DECO-U can restart only if it receives the wake up criterion by the control transferring bus R/R-B, or the special master reset signal RESET-A by the reset receiving unit RST. In the first case it assumes the registers REG-F current content as the transferred process context, and resumes processing starting on such state. In the second case, it initialises the registers REG-F and the other processor functional units and resumes processing on a defined state.

To allow synchronisation of instruction pairing, the decode and control unit DECO-U of each pair processor SPU is directly and reciprocally connected to the other decode/control pair unit by several control/synchronism signals SINC-B. To synchronise the two parallel processes, the decode/control unit DECO-U, is also connected with a further selection/control bus XREG-B to the registers bank REG-F of the pair unit, in a way that it can access them concurrently with that, and it can control the transferring to/from its own executive units EX-U and its own registers REG-F. To co-operate for process migration, the decode and control unit DECO-U is also conceived to remain inactive without processing instructions, signalling its state through at least one signal IDLE to the functional units of any other processor, and holding them in a suspended state.

To allow independent access by both pair units, the register bank REG-F is a dual access one, having a further and dual data SD and control SC ports sets, connected with the pair processor, former to the executive EX-U and bus BU units and latter to the control unit DECO-U. Arbitrating means A-R are located between the dual control ports, MC and SC, of each register bank, for resolving concurrent access conflicts to the same register.

The processing activity inside the active-master processor SPU takes place normally.

The instructions fetched from the program memory M of the external bus C-BUS flow inside the processor through the interface unit BU and optional caches and buffers until they arrive via an instruction bus IST-B to the decode unit DECO-U input. Thanks to said exchanged synchronism signals SINC-B their execution can be synchronised in unison with the instruction stream in the pair unit. The external data stream flows in across the bus unit BU and via the data multi bus DATA-MB to/from the executive units EX-U and the registers banks REG-F of both pair processors. The executive units EX-U can dialogue via said data multi bus DATA-MB with both registers banks REG-F. The control unit DECO-U controls only the executive units EX-U located within the same host processor SPU, and manages as executing process context the resisters REG-F connected with the own resister control bus REGS-B.

Upon execution of pair communication instructions it accesses to the pair unit resisters REG-F by the pair register control bus XREG-B, and controls their transferring via data bus DATA-MB to/from its own executive EX-U and/or bus BU units.

Upon execution of migration instructions, the decode/control unit DECO-U sets up the addressing to select on the external bus C-BUS the processor SPU identified by the instruction operand, and either control the block transferring of the own context register bank REG-F to the destination processor, or it issues on the control transferring bus R/R-B a control release criterion to start a control migration cycle, at the end of which it turns itself inactive slave.

The most seemly way to transfer a process still consists in using the shared bus C-BUS and in connecting to it processors selection means P-SEL, built in the usual way to allow a normal CPU to select memory components or peripherals. The selection means P-SEL, shared with the bus C-BUS, reduce the communication by diffusion to a point-co-point dialogue between the active unit and the selected one only. Driving the address and the control buses of the out shared bus C-BUS, master processor can select any one else, including itself.

A process context, or the set of state variables that allows process suspension, transferring and resuming with continuity, is entirely contained within state registers REG-F of the processor that executes it. This context can be transmitted on the shared C-BUS data bus DATA-B. The selected inactive slave processor receives such context directly in its state registers REG-F, or in other interface BU register file transferable to state registers REG-F at the wake-up time.

The bus unit BU includes a registers selection/control unit S, connected to the external bus C-BUS drivers,/receivers and also, via a selection/control bus LDR-B, to the register bank REG-F. When the bus unit BU is in the inactive-slave mode, said selection unit S detects the input selection signal SELT coming from said external means P-SEL, and connects the bus C-BUS receivers to input also the external address ADRS-B and control CNTL-B buses, and controls the registers REG-F selection and loading by the data buses.

To allow block transferring of the state register file and speed-up the process context migration, the processor accessible registers are consecutively allocated in a unique address space segment. Moreover single instructions are conceived for transferring the whole context. On the shared bus C-BUS each processor SPU takes a different memory address space segment (memory mapped) or, by the right presetting of the migration instructions of the SPU processor and signals of the control bus CNTL-B, within an address space reserved for peripherals (I/O mapped) or for processors (Processor mapped) only.

The control migration can be associated to a particular context variable, for example one bit of the Status Register SR. To achieve greater flexibility and availability it is preferable to transmit separately the control migration message on a special structure. To this aim, the migration structure A-S comprises communication means devoted to the explicit control transferring. Such means can be implemented in several ways, but a suitable one for modularity is that they be of decentralised type, composed of a plurality of identical control communication cells A, singularly distributed within each bus processor SPU interface BU, and connected by the input signal SELT to the aforesaid selection means P-SEL and via control transferring bus R/R-B to the host control unit DECO-U,, and all interconnected by a shared devoted migration bus MIG-B for exchanging among themselves, under the bus migrant process control, criterions or messages concerning control migration, and each able to communicate with its control unit DECO-U during the control releasing/acquiring phases.

It is also preferable to build said migration bus MIG-B with bidirectional level signals, comprising at least:
one signal to send/receive the control migration criterion;
one opposite signal to receive/send the grant/acknowledge criterion as reply to such control migration criterion,
one optional signal to assert or recognise the possession of the shared bus and resources, constantly asserted by the active-master;

by which said communication cells A interact one another with the usual hardware handshake request-acknowledge protocol.

Upon execution of one control migration instruction SIDE.<dest>, the decode/control unit DECO-U sets the addressing to select on the external bus C-BUS the processor SPU identified by the instruction operand <dest>, and it issues on the control transferring bus R/R-B a release criterion to its cell A, that in turn sends on the migration bus MIG-B the migration criterion, then the decode unit DECO-U controls the defined release cycle, at the end of which it arranges with a signal IDLE the bus unit BU in the slave mode and the cell A in receiving, and releases the shared bus C-BUS control to the newly selected processor, suspending indefinitely its own process activity awaiting to be waked up.

On the opposite, the cell A of the selected unit connects itself in receiving, and on the arrival of the control migration criterion from the migration bus MIG-B, sends through a control transferring bus R/R-B the wake-up criterion. The waked-up control unit DECO-U restores the internal state according to the current content of the context register REG-F, eventually adjusts the Program Counter register and, upon the external bus C-BUS releasing, arranges the interface unit BU in master mode and the cell A in transmitting, and takes up again the process The register bank REG-F includes at least one special register for dynamically containing the current executing instruction address. Such register can be the Program Counter, provided that it is not incremented at fetch time, but at the end of the instruction of which it holds the address. Its content is transferred to the other requesting pair unit wherein it is compared for the wanted address to identify the corresponding instruction and to recognise the synchronism condition. "Process explicit synchronisation" instructions are conceived which, within the operands, refer to said special or Program Counter register of the pair unit, and specify exactly one instruction instance of the adjacent process, through the (relocatable) memory M address taken on the instance.

Upon execution of one such instruction, the control unit DECO-U accesses with said pair selection/control bus XREG-B to said modified Program Counter register in the pair unit, and controls the register content transferring via data bus DATA-MB in one its own executive unit, wherein it does a comparison check between the captured address and the address specified within the instruction operand itself. If equality is satisfied the instruction terminates, otherwise the program counter register of the executing unit is updated (not incremented) so that the same instruction is soon executed again on next cycle, or it stalls. This instruction finishes to repeat itself or to stall, only when its execution occurs in parallel with the given address instruction in the pair unit. The wasted time (busy waiting) for repeating executions represents the syrchronisation cost, which can be optimised (with task switching) by the Operating System.

The invention allows also "process implicit synchronisation" instructions that work in a similar way, but they specify within the operand a generic wait condition on the value of one of the pair unit registers. Again, the execution of one such instruction is repeated indefinitely until the selected register does not satisfy the required condition. Process synchronisation instructions can be used either unilaterally by only one of the parallel adjacent processes, or bilaterally by both, and reciprocally refer to one another with the one's address in the other one's operand, to form a synchronising barrier. They can also cause stalls and deadlocks.

Inside a processors pair DPU, the two instruction streams are independent, but they can also be paired in unison as well as proceed with different synchronism asset. In isochronous mode the two paired processors proceed tuned in. In the asynchronous mode the one is disconnected with synchronisms SINC-B coming from the other one, like when the partner unit is inactive.

It is possible to modify the synchronism relationship in a pair using special instructions. Upon execution of a "pair synchronism setting" instruction SINC <modo>, the control unit DECO-U sets itself and the processor in the "mode" required by the instruction operand, respect to the exchanged synchronism signals SINC-B, and eventually records the operand value in the assigned field of the status register SR.

All new instructions are combined with the usual operand addressing modes. Several instruction versions are possible by subdivision or aggregation of instructions in the same category. For instance, it is possible to combine the Program Counter and/or the Status Register SR transferring with a control migration instruction rather then a context migration instruction, or to have a single instruction implementing a control and context migration atomic action.

The use of selection means P-SEL presumes a logic scheme of processor addressing, achievable in several ways. The simplest scheme consists in assigning to each processor SPU, unequivocally among those attached on the same bus C-BUS, a Processor Identification Number or NIP, usable also as operand in the migration instructions. Since to address the process migration correspond to route the communication among parallel processes, to avoid indirect address handling at any computing level, it is necessary to identify the most suitable logic scheme of processor addressing. So in the invention the memory buses C-BUS also are logically and unequivocally numbered with a Bus Identification Number or NIB. The assignment is accomplished in a way that each processor has a NIP corresponding to the NIB of its pair processor bus, and no processor has a NIP corresponding to its own bus NIB. With this scheme, by addressing a processor, a migrant process directly address itself to the corresponding adjacent process bus. On the several buses C-BUS the addressing schemes are similar but never equal. Relationship among NIP and NIB characterises the scheme on each bus as well as the configuration and/or the content of the address decode units ADEC of said selection means P-SEL.

The processor pairing allows also internal optimisations by sharing functional units within the pair. For example the biprocessor DPU may include only one internal time generation unit TGEN-U for both processors of the pair.

The decode and control unit DECO-U is also connected reciprocally to the pair control unit, at least through one signal IDLE, to communicate the operating state active-master or inactive-slave with respect to its own migrant process, which is eventually reported in a field of the Status Register SR, so that the one can know the activity state of the other one. In considering the biprocessor DPU as a communication unit between a bus pair C-BUS, one soon sees the advantage to integrate within it a dualport or communication memory DPM (or 2-FIFO), and also a pair of interrupt communication units. The interrupt structures relevant to each bus C-BUS can be interconnected in pairs with local private structures, following the processors pairing scheme. An interrupt communication unit, working and accessible as any generic interrupting device, is normally connected to the interrupt structure of the one bus C-BUS, but characteristically connected with point-to-point buses to a corresponding identical unit belonging to the interrupt structure of the bus C-BUS of the other one, so as to transfer interrupt messages between the paired bus C-BUS. One such interrupt communication unit can be integrated within the pair processor SPU, by connecting it internally with a complete data-address-control bus to the respective bus unit BU, or to the memory management unit (MMU) if any, and making it accessible by the external C-BUS.

According to the invention, the bus C-BUS private memories M, even with physically disjoint address spaces, can also be shared by all parallel adjacent processes in no concurrent way. To this purpose it is enough that the two processors SPU of a pair exchange reciprocally the fetched instruction stream and the accompanying context. To this aim some buses of both processors of the pair can be made dynamic by introducing circuit switching means M-X for reconfiguring the pairing asset. Upon synchronised execution of dedicated switching instructions XEX on both pair units, such means M-X may switch in a way that instantaneously each unit could receive instructions fetched by the other one and could see as own context the pair unit register bank REG-F. There are several ways to insert switching elements within the pair structure P-P, if one includes also the data multi bus DATA-MB, but it is better to switch the lower number of buses. In accordance with the invention, switching elements M-X are interposed only on the bus pairs REGS-B. XREG-B connecting each decode and control unit DECO-U to both register banks REG-F, and on the two buses IST-B allowing the instruction flow input to the decode units DECO-U. The switching elements need only two switching states or functions: "straight", wherein the switching means NIL-X are transparent and do not modify bus connections seen so far; and "cross", wherein the first input part and the second output part of each said bus pairs results inversely connected to one another within the pair. In order to control their switching, each control unit DECO-U is directly connected to said switching means M-X with at least one output signal X-S and one input signal C. Control mechanism is the same for both switching states.

Upon execution of a switching instruction XEX <b>, the decode and control unit DECO-U commands through the output signal X-S the switching state required by the Boolean operand <b>, then checks the operand with the input signal C that carries back the means M-X switching state. If they coincide (i.e. switching done), the instruction ends, after eventual exchange of some register: otherwise it stalls or the Program Counter register is adjusted (decreased or not increased) in such a way that the instruction will be executed again on next cycle. The processor SPU stalls in busy-waiting state by executing again indefinitely the switching instruction XEX until the switching of said means M-X occur when the pair unit also requires the same switching state.

At switching time it takes place also the two processes synchronisation. During the "cross" switching state, instructions fetched from one bus C-BUS directly act on variables located in the private memory M of the other one adjacent bus, so that data streams of the two running processes result switched on the memory M buses C-BUS of corresponding instruction streams. Within this asset the two involved processes cannot migrate and any execution of migration instructions causes an exception handling. Since switching involves twin bus pairs, it is natural to use switching blocks IXI made up of the usual 2×2 type elements, having two inputs and two outputs controlled by an input control port CP, and capable to assume, between inputs and outputs, one of said switching states (straight or cross) in accordance with the logic value put on the control port CP. At least three switching blocks IXI are needed, one for each said bus pair, having all control ports CP interconnected, in way to be able to switch simultaneously as reaction to one single control signal C. A switching enable unit XAND with at least two inputs connected respectively to the two command signals X-S coming from both control units DECO-U, enables the switching with at least one output control signal C, connected to the control ports CP of all switching blocks IXI and to the control units themselves, upon concurrent receiving on both inputs of agree switching requests. Eventual processor SPU status register SR, besides the usual information concerning its processor state, can contain further fields concerning the migration activity, the own and pair processor synchronism mode, the switching means M-X mode, etc.

INDUSTRIAL APPLICABILITY

The invention allows industrial scale production of the same economic microelectronic (VLSI) component that integrates both processors SPU of a pair DPU and their interconnections P-P, eventually including also said switching means M-X, a dual port or communication memory DPM and a pair of interrupt communication units, in a single biprocessor unit, usable on its turn for manufacturing parallel and compatible computers in a large range of configurations, powers and costs, addressed toward different market segments, from personal to supercomputers.

What is claimed is:

1. General purpose parallel computer comprising a plurality of processors (SPU), a plurality of main memory units (M) and a plurality of memory buses (C-BUS), each memory bus comprising at least a data bus (DATA-B), an address bus (ADRS-B) and a control bus (CNTL-B), and each memory bus (C-BUS) on which a single process at a time is executed, is connected at least to a main memory unit (M) and to a processor (SPU) which is redundantly replicated on said memory bus (C-BUS);

said computer being characterized in that:

each processor (SPU) is reciprocally coupled in a pair to another processor (SPU) belonging to a different memory bus (C-BUS) directly through a pair interconnection (P-P), the two processors sharing at least a group of respective register banks (REG-F) and mutually exchanging context data in response to the execution of pair communication instructions so as to form a single biprocessor unit (DPU);

each said memory bus (C-BUS) is linked to a migration structure (A-S) which is directly connected to all the processors (SPU) sharing said memory bus (C-BUS), so as to allow process migration from processor to processor;

only one processor (SPU) per memory bus (C-BUS) is active at a time therefore assuming the state of master of said memory bus (C-BUS), all other (SPU) lying inactive in a state slave of the memory bus (C-BUS) but allowing the master-active processor to perform read and write operation on their own register banks (REG-F);

in response to migration instructions, a processor (SPU) in the active state transfers process context and control to an inactive-slave destination processor (SPU) of the same memory bus (C-BUS), which becomes the new master-active processor of said memory bus (C-BUS) and restarts computation according to the contents of its register bank (REG-F).

2. Parallel computer as claimed in claim 1, characterised in that each of said register bank (REG-F) includes at least a Program Counter register (PC) containing the current executing instruction address.

3. Parallel computer as claimed in claim 1, wherein said migration structure (A-S) is suitable for receiving from the current master-active processor (SPU) of its memory bus (C-BUS) either a slave destination processor address and control signals, and for delivering said process context data to said destination processor (SPU) of the same memory bus (C-BUS).

4. Parallel computer as claimed in claim 3, wherein said migration structure (A-S) synchronises the process migration between the processors (SPU) belonging to the same memory bus (C-BUS) by receiving from the current master processor either one destination processor address and a control migration message and delivering said control migration message to said destination processor.

5. Parallel computer as claimed in claim 4, wherein said control migration message is associated to a process context variable like a bit of the processor Status Register (SR) of said register bank (REG-F).

6. Parallel computer as claimed in claim 4, wherein each processor (SPU) in a pair (DPU) comprises usual functional units, executive units (EX-U) including at least an arithmetic and logic unit (ALU), a decode and control unit (DECO-U) and a memory bus (C-BUS) interface unit (BU) characterised in that said bus interface unit (BU):

interfaces said migration structure (A-S), is connected to said register bank (REG-F) through at least one selection and control bus (LDR-B), for loading of external process context data, and sets itself to either master or slave of the memory bus (C-BUS) in response to at least one signal (IDLE) issued by the decode and control unit (DECO-U).

7. Parallel computer as claimed in claim 6 characterised in that said bus interface unit (BU) is further connected to said decode and control unit (DECO-U) through at least one control transferring bus (R/R-B) for exchanging control migration messages and in master mode it receives release messages from the decode and control unit (DECO-U) and routes control migration messages onto the migration structure (A-S);

in slave mode receives control migration messages coming from the migration structure (A-S) and transfers wake-up messages to the decode and control unit (DECO-U).

8. Parallel computer as claimed in claim 6, wherein said bus interface unit (BU) in slave mode allows the memory bus (C-BUS) to perform read and write operations on the register bank (REG-F).

9. Parallel computer as claimed in claim 6 wherein said register bank (REG-F) is a dual access one, comprising a dual data port set (SD) connected through a data multi-bus (DATA-MB) at least to the executive units (EX-U) of the other processor (SPU) in the pair (DPU), controlled by a further dual control port (SC) connected through a control bus (XREG-B) to the decode and control unit (DECO-U) of the other processor (SPU) in the pair (DPU), and arbitrating means (A-R) for resolving conflicts resulting from concurrent accesses to the same register, so as to be symmetrically and concurrently accessible by both processors (SPU) of the processor pair (DPU).

10. Parallel computer as claimed in claim 6 wherein the decode and control unit (DECO-U) of a processor (SPU) is reciprocally connected to the decode and control unit (DECO-U) of the other processor (SPU) in the same pair (DPU) through a synchronism bus (SINC-B), for pairing of instructions so as to execute the two parallel processes at the same speed.

11. Parallel computer as claimed in claim 10, characterised in that said bus interface unit (BU) of each processor (SPU) in a pair (DPU)

comprises a reset unit (RST) having an input connected to a system reset signal (RESET), an input connected to a further strapped signal (M/S) and an output connected through two different internal reset signals (RESET-A, RESET-P) to the decode and control unit (DECO-U) of the same processor (SPU), and in response to the receiving of a system reset message sends to said decode and control unit (DECO-U) one of said internal reset signals (RESET-A, RESET-P) corresponding to the logic value read on said strapped signal (M/S).

12. Parallel computer as claimed in claim 11 wherein said decode and control unit (DECO-U) in response to the receiving of said respective signal (RESET-A, RESET-P) issued by a reset unit (RST) sets itself as either master-active or slave-inactive and resets accordingly the register bank (REG-F) of its processor (SPU).

13. Parallel computer as claimed in claim 12 wherein said decode and control unit (DECO-U) in slave-inactive mode suspends its activity and holds its processor (SPU) activity in a suspended state, sets the bus interface unit (BU) to slave mode, and allows access to the register bank (REG-F) of its processor (SPU) by either the connected memory bus (C-BUS) of the connected bus interface unit (BU) and by the pair (DPU).

14. Parallel computer as claimed in claim 7 wherein said decode and control unit (DECO-U) in slave-inactive mode sets itself as master-active upon receiving of wake-up messages arriving on said control transferring bus (R/R-B).

15. Parallel Computer as claimed in claim 12, wherein said decode and control unit (DECO-U) is internally connected to a state field (modo) of its status register (SR), said field (modo) containing a current execution synchronism mode, and said decode and control unit (DECO-U) in master-active mode executes instructions synchronously or asynchronously with respect to the exchanged synchronism signals (SINC-B), according to the content of said synchronism mode field (modo).

16. Parallel computer as claimed in claim 15 wherein said decode and control unit (DECO-U) in master-active mode sets the bus unit (BU) to master mode, resumes the processing activity of its host processor (SPU) starting upon the contents of the corresponding register bank (REG-F), which is controlled by the register control bus (REGS-B), and synchronises itself with the other processor (SPU) in the pair (DPU) so as to parallelize instructions.

17. Parallel computer as claimed in claim 16 wherein said decode and control unit (DECO-U) in master-active mode is able to modify the execution synchronism upon execution of a "pair synchronism setting" instruction (SINC <modo>).

18. Parallel computer as claimed in claim 15 wherein said processor (SPU) in master-active mode, in response to the execution of "process migration" instructions, controls on said memory bus (C-BUS) the processor addressing specified by the instruction operand, modifying, if necessary, the content of its Program Counter register (PC), transfers onto the bus (C-BUS), through the interface (BU), the content of its register bank (REG-F), including the Program Counter register (PC), and a control migration message and sets itself to slave-inactive mode.

19. Parallel computer as claimed in claim 14 wherein said decode and control unit (DECO-U) in master-active mode generates, upon execution of special control migration instructions, on said control transferring bus (R/R-B) release messages for starting a control migration cycle on the external buses (C-BUS, MIG-B) and for suspending any activity of the host processor (SPU), so as to set itself, at the end of said migration cycle, to slave-inactive.

20. Parallel computer as claimed in claim 9 wherein said processor (SPU), in response to "pair communication" instructions, accesses the resister bank (REG-F) of the other processor (SPU) in the pair (DPU), and transfers its content into the executive units (EX-U) or the register bank (REG-F) of its processor (SPU) and vice versa.

21. Parallel computer as claimed in claim 20 wherein said processor (SPU) in a pair, in response to the execution of "process synchronisation" instructions, whose operands specify a condition on a register of the register bank (REG-F) of the other processor (SPU) in the pair (DPU), including the Program Counter register (PC), accesses said register in the pair (DPU) to compare its content with said condition programmed in the instruction operand, and delays the continuation of the executing process, by decreasing its Program Counter register and executing again the same instruction or by stalling the next instruction, until said condition is not satisfied.

22. Parallel computer as claimed in claim 6 wherein said migration structure (A-S) comprises a processor selection means (P-SEL) for selecting the processors (SPU) belonging to the same memory bus (C-BUS), having the input connected to said address and control (ADRS-B, CNTL-B) buses of the memory bus (C-BUS), and the output connected to each processor (SPU) of the memory bus (C-BUS) through at least one separate selection signal (SELT), suitable for decoding part of said address bus (ADRS-B) and activating a single output signal (SELT) toward the selected processor (SPU), in accordance with control bus (CNTL-B) signals and validation times.

23. Parallel computer as claimed in claim 22 wherein said migration structure (A-S) is connected to register selection units (S) for selecting and accessing the register bank (REG-F) of each processor (SPU) sharing, its same memory bus (C-BUS), each selection unit (S) being singularly distributed in the bus interface unit (BU) of each of said processors (SPU), and being connected to the address and control buses (ADRS-B, CNTL-B) of said shared memory bus (C-BUS), to the memory bus tranceivers of its bus interface unit (BU), to the selection signal (SELT) coming from said selection means (P-SEL), for recognising that the processor has been selected, and to at least one internal signal (IDLE), for recognising whether the processor is in master or slave mode, and being further connected through a control and selection bus (LDR-B) to the register bank (REG-F) of its processors (SPU) for allowing access control and loading of said register bank (REG-F) from an external data bus (DATA-B) when the processor (SPU) is in inactive-slave mode.

24. Parallel computer as claimed in claim 23 wherein said migration structure (A-S) comprises:
   a plurality of migration communication cells (A) for synchronising control migration, singularly distributed in each bus interface unit (BU) belonging to said memory bus (C-BUS) and interconnected through a migration bus (MIG-B), each cell (A) being connected to the host control unit (DECO-U) through a control transferring bus (R/R-B) for handling control migration and being further connected to the selection signal (SELT) coming from said selection means (P-SEL) and to at least one state signal (IDLE) issued by the decode and control unit (DECO-U) for setting itself as master-transmitting or slave-receiving on said migration bus (MIG-B), according to the active or inactive state of the decode and control unit (DECO-U), in a way that, in transmitting mode, it receives a releasing message by the control transferring bus (R/R-B) and sends a control migration message on the shared migration bus (MIG-B), and, in receiving mode, it receives by the migration bus (MIG-B) a control migration message and sends a wake-up message on the control transferring, bus (R/R-B).

25. Parallel computer as claimed in claims 22 wherein said selection means (P-SEL) of each memory bus (C-BUS) comprises at least one address decoder (ADEC) which is univocally identified with respect to all other selection means (P-SEL) so as to:
   assign to each memory bus (C-BUS) a unique Bus Identification Number (NIB);
   unequivocally select a processor (SPU) belonging to said memory bus (C-BUS) by responding to a Processor Identification Number (NIP) which matches the Bus Identification Number identifying the memory bus (C-BUS) of the processor (SPU) with which the selected processor is paired.

26. Parallel computer as claimed in claim 6 wherein said pair (DPU) of processors (SPU) comprises a single time generation unit (TGEN-U) for both processors (SPU) of the pair (DPU), having the input connected to external clock signals (CLOCK) and the output signals (CLK) connected to both of the decode and control units (DECO-U) and to the other synchronous parts of the pair (DPU), so as to provide internal time signals, with same or different frequencies, to all the units of the whole pair (DPU) for which such signals are required.

27. Parallel computer as claimed in claim 9, wherein said pair (DPU) of processors (SPU) is characterised in that it comprises within the pair interconnection (P-P), circuit switching means (M-X) symmetrically placed between said register control buses (REGS-B, XREG-B) of both units in the pair, and between buses (IST-B) carrying the instruction stream to the inputs of the decode and control units (DECO-U), for switching the pair of instruction buses (IST-B) with the pair of decode units (DECO-U), and each pair of register control buses (REGS-B, XREG-B) with the respective pair of control ports (MC, SC) of both register banks (REG-F) in a way that said register banks and the instruction streams are exchanged between the two processors (SPU), and each one (SPU) can continue processing with the instructions fetched by the other one (SPU), on data stored in the memory unit (M) to which the processor (SPU) belongs.

28. Parallel computer as claimed in claim 27, wherein said decode and control unit (DECO-U)
   is connected to said switching means (M-X) through at least one output signal (X-S) and at least one input signal (C),
   commands, upon execution of special switching instructions (XEX <b>), the switching of said switching means (M-X) and
   synchronises or delays the process executed by its processor (SPU) with the one running on the other processor (SPU) of the pair (DPU) until the switching takes place.

29. Parallel computer as claimed in claim 28, wherein said switching means (M-X) are characterised in that they comprise:
   a plurality of switching elements (IXI) of the 2×2 type, with two inputs, two outputs and one control port (CP), placed between the signal pairs of each bus pair to switch and connected to all of the interconnected control ports (CP), for switching simultaneously in one of two possible connection states: "straight", wherein the two inputs are directly connected to the corresponding outputs; or "crossed", wherein the two inputs are inversely connected to the two outputs.

30. Parallel computer as claimed in claim 29, wherein said switching means (M-X) are characterised in that they comprise:
   a switching enable unit (XAND), connected to at least one input signal (X-S) of each decode and control unity (DECO-U) in a pair (DPU), and connected, through at least one output signal (C), to all said control ports (CP) and to the decode and controls units (DECO-U) of both processors, emitting on said output signal (C) a switching message complying to an identical and synchronised request coming from both of its inputs (X-S).

31. Parallel computer as claimed in claim 28, wherein an optional processor (SPU) Status Register (SR) is extended so as to comprise, singularly or in combination, the following readable fields:
   a field (I), for recording the operative master-active or slave-inactive modes of the processor and that of the processor pair;
   a field (modo), writable by the "pair synchronism setting" instructions (SINC <modo>), storing the synchronism mode of either its processor (SPU) and the one of the other processor (SPU) in the pair;
   a field (X) modifiable by said switching instructions (XEX <b>), storing the current configuration of said switching means (M-X).

32. Parallel computer as claimed in claim 1, characterised in that it comprises an usual dual port memory unit (DPM) or an usual 2-FIFO communication memory unit (DPM) for each of said processor pairs or biprocessors (DPU), and
   each of said dual port memory unit (DPM) is connected between a pair of memory buses (C-BUS) in a way that each pair of said memory buses (C-BUS), which is already interconnected with a processor pair (DPU), is also interconnected with said dual port memory (DPM), which allows a bidirectional simultaneous data communication between said two interconnected memory buses (C-BUS).

33. Parallel computer as claimed in claim 1, characterised in that the interrupt structure of each memory bus (C-BUS) comprises and accesses an interrupt communication unit for each processor (SPU) belonging to said memory bus (C-BUS), said unit being coupled through dedicated pointto-point buses to a corresponding identical interrupt communication unit similarly connected to the memory bus (C-BUS) of the other processor (SPU) in the pair (DPU), so as to send interrupt messages to said memory bus (C-BUS) of the other processor (SPU) in the pair and receive interrupt messages therefrom.

34. A method of operating a general purpose parallel computer, the computer comprising a plurality of processors, a plurality of main memory units, and a plurality of memory buses, wherein each memory bus comprising a data bus, an address bus and a control bus, and each memory bus is connected at least to a main memory unit and to a processor which is redundantly replicated on the memory bus, on which a single process at a time is executed, and each processor comprising a register bank including at least a Program Counter register containing the current executing instruction address; the method comprising the steps of:

arranging one processor at a time, among the plurality of processors which share a common memory bus, in a master-active mode of said bus, and concurrently arranging all other processors of the same bus in a slave-inactive mode, in order to execute a single process at a time on said memory bus;

transferring, in response to migration instructions, the process context and control from said master-active processor to any one of said slave-inactive processors sharing the same memory bus to which said master-active processor is connected, (in order to allow a direct process migration from processor to processor);

connecting each processor of a memory bus directly to another processor which is connected to a different memory bus, the two processors sharing at least a group of a respective register bank, in order to form a plurality of biprocessor units between pairs of different memory buses, and inducing each processor of each biprocessor unit to exchange data and control and synchronisation signals for synchronising different processes respectively executed on the pair of processors of the biprocessor unit.

35. The method according to claim 34, characterised in that the step of transferring the process context and control comprises the steps of:

transferring from the currently master-active processor the context register content including the program counter to the destination slave-inactive processor, to put said master-active processor in the slave inactive state and the previously slave-inactive processor in the master-active state, in response to a control migration message.

36. The method according to claim 35, characterised in that the pair of processors of each biprocessor unit are adapted to receive and execute different processes and to synchronise them by mutually accessing the process context data and the respective program counters of each processor.

37. The method according to claim 36, characterised in that each processor among the processors belonging to the same memory bus is assigned a unique processor identification number (NIP) and each memory bus is assigned a unique bus identification number (NIB).

38. The method according to claim 37, characterised in that it further comprises the step of:

unequivocally selecting a processor connected to said memory bus, in order to transfer a currently executed process, by responding to said processor identification number (NIP) which matches the bus identification number (NIB) which identifies the memory bus of the processor with which the selected processor is paired.

* * * * *